(12) United States Patent
Kil et al.

(10) Patent No.: US 10,313,979 B2
(45) Date of Patent: Jun. 4, 2019

(54) APPARATUS AND METHOD FOR CONTROLLING UPLINK POWER IN WIRELESS COMMUNICATION SYSTEM

(71) Applicant: Samsung Electronics Co., Ltd., Suwon-si, Gyeonggi-do (KR)

(72) Inventors: Ki-Ho Kil, Seoul (KR); Min-Ho Shin, Seongnam-si (KR); Min-Sung Hur, Yeoju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 101 days.

(21) Appl. No.: 15/363,130

(22) Filed: Nov. 29, 2016

(65) Prior Publication Data

US 2017/0367052 A1    Dec. 21, 2017

(30) Foreign Application Priority Data

Jun. 16, 2016    (KR) .......................... 10-2016-0075047

(51) Int. Cl.
*H04W 52/14* (2009.01)
*H04W 52/20* (2009.01)
(Continued)

(52) U.S. Cl.
CPC ......... *H04W 52/146* (2013.01); *H04W 52/20* (2013.01); *H04W 52/221* (2013.01);
(Continued)

(58) Field of Classification Search
CPC ..................................... H04B 7/0417–7/0447; H04B 7/0619–7/0663; H04L 5/0053–5/0057;
(Continued)

(56) References Cited

U.S. PATENT DOCUMENTS

2004/0001472 A1    1/2004    Kwak et al.
2006/0003787 A1    1/2006    Heo et al.
(Continued)

FOREIGN PATENT DOCUMENTS

KR    2003/0088544 A    11/2003

*Primary Examiner* — Timothy J Weidner
(74) *Attorney, Agent, or Firm* — Harness, Dickey & Pierce, P.L.C.

(57) ABSTRACT

An apparatus for controlling an Uplink (UL) power in a wireless communication system including a transmitter/receiver and a controller may be provided. The transmitter/receiver may receive/decode Downlink (DL) data, transmit a feedback signal with respect to the DL data, and receive Transmit power Control (TPC) commands from active set cells including a serving cell. The controller may decode the TPC commands to generate a combined TPC command, in which decoded TPC commands of the active set cells are combined, and calculate a transmission error rate of an UL feedback transmission signal and a requested rate of transmit power increase of the serving cell, determine a transmit power gain offset and the requested rate of transmit power increase, determine an UL power for transmitting a feedback signal with respect to the received DL data based on the transmit power gain offset, and transmit the feedback signal based on the UL power.

18 Claims, 5 Drawing Sheets

(51) Int. Cl.
　　　*H04W 52/22*　　(2009.01)
　　　*H04W 52/48*　　(2009.01)
　　　*H04W 52/52*　　(2009.01)
　　　*H04W 52/56*　　(2009.01)
　　　*H04W 52/60*　　(2009.01)
(52) U.S. Cl.
　　　CPC ........... *H04W 52/48* (2013.01); *H04W 52/52* (2013.01); *H04W 52/56* (2013.01); *H04W 52/60* (2013.01)
(58) Field of Classification Search
　　　CPC ............ H04L 1/12–1/20; H04W 24/02–24/10; H04W 52/04–52/60
　　　See application file for complete search history.

(56) References Cited

U.S. PATENT DOCUMENTS

| | | | | |
|---|---|---|---|---|
| 2008/0051028 A1* | 2/2008 | Jung | ................... | H04W 52/146 455/13.4 |
| 2010/0331035 A1* | 12/2010 | Bark | ..................... | H04W 52/40 455/522 |
| 2012/0257568 A1* | 10/2012 | Cai | ....................... | H04L 1/1614 370/328 |

* cited by examiner

APPARATUS AND METHOD FOR CONTROLLING UPLINK POWER IN WIRELESS COMMUNICATION SYSTEM

CROSS-REFERENCE TO RELATED APPLICATION(S)

This application claims priority under 35 U.S.C. § 119(a) to a Korean patent application filed in the Korean Intellectual Property Office on Jun. 16, 2016 and assigned Serial No. 10-2016-0075047, the entire disclosure of which is incorporated herein by reference.

TECHNICAL FIELD

The present disclosure relates to an apparatus and method for controlling power for an uplink in a wireless communication system.

BACKGROUND

In a wireless communication system supporting a High Speed Downlink Pack Access (HSDPA) service, a Hybrid Automatic Repeat Request (HARQ) scheme is used as a link adaptation technique. In a HSDPA system, a terminal may receive Downlink (DL) data from a base station through a High-Speed Downlink Shared Channel (HS-DSCH), and transmit uplink data through a High-Speed Dedicated Physical Control Channel (HS-DPCCH).

The terminal may measure a received common pilot channel to help the base station to determine a channel state and transmit a Channel Quality Indicator (CQI) reflecting the measurement result through the HS-DPCCH. The base station may transmit packet data to which Adaptive Modulation and Coding (AMC) is applied. A modulation scheme and a channel coding rate of a channel may vary with a channel change indicated by the CQI to improve the throughput of the channel. Further, the terminal may feed back successful or failing reception of the transmitted packet data using an Acknowledgement (ACK) or a Negative Acknowledgement (NACK) through the HS-DPCC to notify retransmission or non-retransmission. In the HSDPA system, 2 ms (corresponding to 3 slots) may be defined as one subframe and a Transmission Time Interval (TTI), and in the HS-DPCCH, HARQ ACK or NACK information may be fed back to the base station in the first slot.

When the ACK/NACK is fed back in the HS-DPCCH, a transmit power (hereinafter, referred to as a HS-DPCCH transmit power or an ACK/NACK feedback transmit power) may be determined based on values signaled by the base station based on DPCCH closed loop power control using combined Transmit Power Control (TPC). If the DPCCH power control is performed by combining TPC included in the active set, a serving cell requests power may increase. If a combining result of active sets is power decrease, the request of the serving cell may be difficult to be accepted. When the transmit power of the HS-DPCCH is determined based on a value determined by the base station, the terminal may not change an Uplink (UL) transmit power until being instructed by the base station even when the terminal senses rapid deterioration of the channel state. As a result, it is difficult to reflect the channel state to the UL transmit power in real time. If the transmit power of the HS-DPCCH does not increase when the wireless channel state is deteriorated, the ACK/NACK feedback transmission error rate may increase, and thus the terminal may fail to receive desired data. As a result, the rapid retransmission and error recovery capabilities, which are known advantages of HARQ, may be deteriorated, and thus data throughput may be degraded. Therefore, properly adjusting the transmit power of the HS-DPCCH according to an UL channel state may be desired.

The above information is presented as background information only to assist with an understanding of the present disclosure. No determination has been made, and no assertion is made, as to whether any of the above might be applicable as related art with regard to the present disclosure.

SUMMARY

Accordingly, the present disclosure provides method and/or apparatuses for controlling an UL power to compensate a data throughput reduction caused by an ACK/NACK feedback transmission error rate increase in a wireless communication system.

The present disclosure also provides methods and/or apparatuses for controlling an UL power by using an ACK/NACK feedback transmission error rate or a requested rate of power increase of a TPC command of a serving cell when power decrease is requested in a combined TPC to reduce the ACK/NACK feedback transmission error rate in a wireless communication system.

According to an example embodiment, a method for controlling an Uplink (UL) power by a User Equipment (UE) in a wireless communication system may include receiving and decoding Downlink (DL) data, receiving Transmit Power Control (TPC) commands from active set cells, the active set cells including a serving cell, and decoding the TPC commands to generate a combined TPC command, in which decoded TPC commands of the active set cells are combined, calculating a transmission error rate of an UL feedback transmission signal based on decoded DL data, calculating a requested rate of transmit power increase of the serving cell when power decrease is requested in the combined TPC command based on the decoded TPC commands, determining a transmit power gain offset based on the transmission error rate and the requested rate of transmit power increase of the serving cell, determining an UL power for transmitting a feedback signal with respect to the received DL data based on the transmit power gain offset, and transmitting the feedback signal based on the UL power.

According to an example embodiment, an apparatus for controlling an Uplink (UL) power in a wireless communication system may include (1) a transmitter/receiver configured to receive and decode Downlink (DL) data, transmit a feedback signal with respect to the DL data, and receive Transmit power Control (TPC) commands from active set cells, the active set cells including a serving cell, and (2) a controller configured to decode the TPC commands to generate a combined TPC command, in which decoded TPC commands of the active set cells are combined, calculate a transmission error rate of an UL feedback transmission signal based on decoded DL data, calculate a requested rate of transmit power increase of the serving cell when the combined TPC command requests power decrease based on the decoded TPC commands, determine a transmit power gain offset based on the transmission error rate and the requested rate of transmit power increase of the serving cell, determine an UL power for transmitting a feedback signal with respect to the received DL data based on the transmit power gain offset, and transmit the feedback signal based on the UL power.

According to an example embodiment, a chip for wireless communication may include (1) a transmitter/receiver configured to transmit a feedback signal with respect to the DL data and receive Transmit Power Control (TPC) commands from active set cells, the active set cells including a serving cell, and (2) a processor configured to decode the DL data decode the TPC commands to generate a combined TPC command, in which decoded TPC commands of the active set cells are combined, calculate a transmission error rate of an Uplink (UL) feedback transmission signal based on decoded DL data, calculate a requested rate of transmit power increase of the serving cell when the combined TPC command requests power decrease based on the decoded TPC commands, determine a transmit power gain offset based on the transmission error rate and the requested rate of transmit power increase of the serving cell, determine an UL power for transmitting a feedback signal with respect to the DL data based on the transmit power gain offset, and transmit the feedback signal based on the UL power.

According to an example embodiment, a chip for wireless communication may include (1) a transmitter/receiver configured to transmit a feedback signal with respect to the DL data, and receive Transmit Power Control (TPC) commands from active set cells, the active set cells including a serving cell, the TPC commands being commands instructing a User Equipment (UE) to adjust power of an Uplink (UL), (2) a memory configured to store computer-readable instructions, and (3) one or more processors configured to execute the computer-readable instructions such that the one or more processors are configured to receive and decode at least one of the DL data or the TPC commands, decoded TPC commands generating a combined TPC command in which decoded TPC commands of the active set cells are combined, calculate at least one of (1) a transmission error rate of an UL feedback transmission signal based on decoded DL data or (2) a requested rate of transmit power increase of the serving cell when the combined TPC command requests power decrease based on the decoded TPC commands, determine a transmit power gain offset based on at least one of the transmission error rate or the requested rate of transmit power increase of the serving cell, determine an UL power for transmitting a feedback signal with respect to the DL data based on the transmit power gain offset, and transmitting the feedback signal based on the UL power.

BRIEF DESCRIPTION OF THE DRAWINGS

Throughout the drawings, it should be noted that like reference numbers are used to depict the same or similar elements, features, and structures, wherein.

DETAILED DESCRIPTION

Some example embodiment of the present disclosure will be described in detail with reference to the accompanying drawings. However, the description is not intended to limit the present disclosure to particular example embodiments, and it should be construed as including various modifications, equivalents, and/or alternatives according to the embodiments of the present disclosure. In regard to the description of the drawings, like reference numerals refer to like elements.

Terms defined in the present disclosure are used for only describing a specific example embodiment and may not have an intention to limit the scope of other example embodiments.

Before a detailed description of the present disclosure is made, examples of interpretable meanings will be provided for several terms used herein. However, it should be noted that the meanings of the terms are not limited to the examples provided below.

A Base Station (BS) is an entity that communicates with a User Equipment (UE), and may also be referred to as a BS, a NodeB (NB), an eNodeB (eNB), an Access Point (AP), or the like.

The UE is an entity that communicates with the BS, and may also be referred to as a UE, a Mobile Station (MS), a Mobile Equipment (ME), a device, a terminal, or the like.

The present disclosure proposes a scheme for controlling a transmit power of an ACK/NACK feedback channel adaptively to an ACK/NACK feedback transmission error rate or a requested rate of power increase of a combined TPC command of a serving cell in case of power decrease being requested in the combined TPC command.

Figure 1:
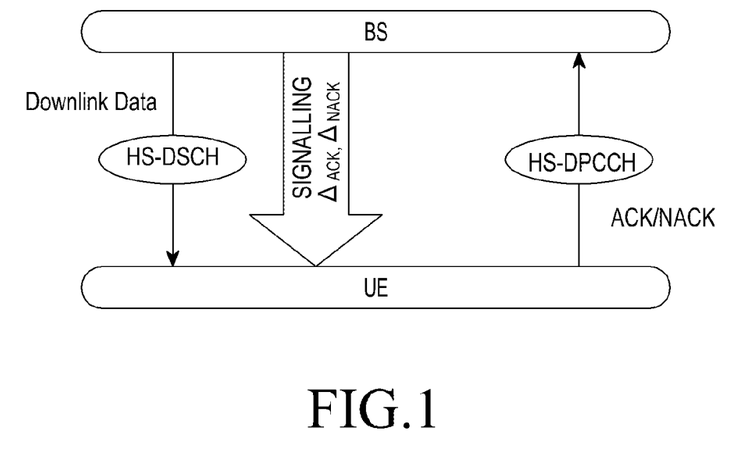
FIG. 1 is a block diagram of a UE according to an example embodiment of the present disclosure.

FIG. 1 schematically illustrates HARQ data transmission and reception between a BS and a UE in a general HSDPA system.

Referring to FIG. 1, the BS transmits uplink data to the UE through the HS-DSCH and transmits an index ($\Delta_{ACK}$, $\Delta_{NACK}$) for UL feedback transmit power control through DL signaling. The UE having received the DL data transmits a feedback with respect to a DL packet to a UL through the HS-DPCCH channel. That is, the UE transmits an ACK if normally receiving a DL packet and transmits a NACK to the UL if failing to normally receive the DL packet to request packet retransmission. In this case, a transmit power for ACK/NACK transmission is determined based on an index ($\Delta_{ACK}$, $\Delta_{NACK}$) received through DL signaling. More specifically, a quantized power gain factor rate $A_{hs}$ of the HS-DPCCH is obtained based on an index ($\Delta_{ACK}$, $\Delta_{NACK}$) received through DL signaling and a power gain factor $\beta_c$ of the DPCCH determined through closed-loop power control based on the combined TPC command as shown in Table 1, and then a power gain factor ($\beta_{hs-ACK}$, $\beta_{hs-NACK}$) for ACK/NACK transmission is determined to finally determine an ACK/NACK transmit power.

TABLE 1

| $(\Delta_{ACK}, \Delta_{NACK})$ | Quantized Power Gain Factor Rate $A_{hs} = (\beta_{hs\text{-}ACK}, \beta_{hs\text{-}NACK})/\beta_c$ |
|---|---|
| 12 | 76/15 |
| 11 | 60/15 |
| 10 | 48/15 |
| 9 | 38/15 |
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

However, in a situation where an UL channel state is deteriorated rapidly, an UL power gain factor received by the UE from the BS may be a value that does not sufficiently reflect a current deteriorated UL channel state. In this case, if the UL power gain factor received by the UE from the BS is considered to determine an ACK/NACK feedback transmit power and transmit a signal, the ACK/NACK feedback signal may not be correctly delivered to the BS due to the deteriorated UL channel state. Therefore, if the UL channel state is deteriorated rapidly, further increasing a power for ACK/NACK feedback transmission may be desirable to reflect or take into account a current UL channel state in ACK/NACK feedback transmit power determination. The present disclosure relates to a scheme for determining an ACK/NACK feedback transmit power by further considering an ACK/NACK feedback transmission error rate of the HS-DPCCH or a requested rate of power increase of the combined TPC command in case of power decrease being requested in the combined TPC command.

Figure 2:
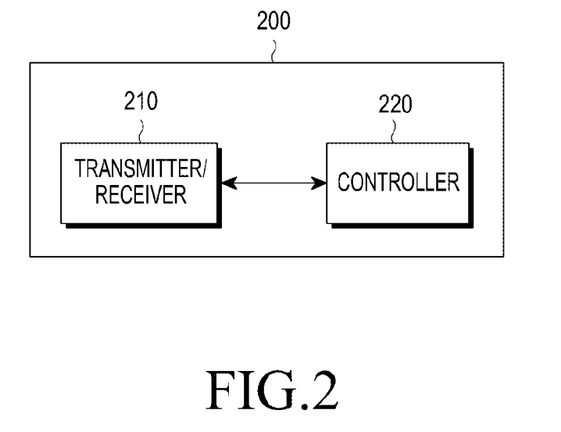
FIG. 2 is a block diagram of a controller included in a UE according to an example embodiment of the present disclosure.

FIG. 2 is a block diagram of a UE according to an example embodiment of the present disclosure.

Referring to FIG. 2, an UE 200 may include a transmitter/receiver 210 and a controller 220. The transmitter/receiver 210 may perform signal and data transmission/reception with a BS or another UE over a wireless network, and the controller 220 may control operations of the transmitter/receiver 210 and process a voice signal and data transmitted/received through the transmitter/receiver 210. Although signal transmission and reception are performed through the transmitter/receiver 210, operations of the transmitter/receiver 210 may be controlled by the controller 220 such that signal transmission and reception may also be regarded as being performed by the controller 220. The transmitter/receiver 210 may be implemented with, for example, a Radio Frequency (RF) chip, and the controller 220 may be implemented with, for example, a modem chip. While the transmitter/receiver 210 and the controller 220 are illustrated as separate blocks in FIG. 2, the transmitter/receiver 210 and the controller 220 may be configured with one device (e.g., a single chip).

Figure 3:
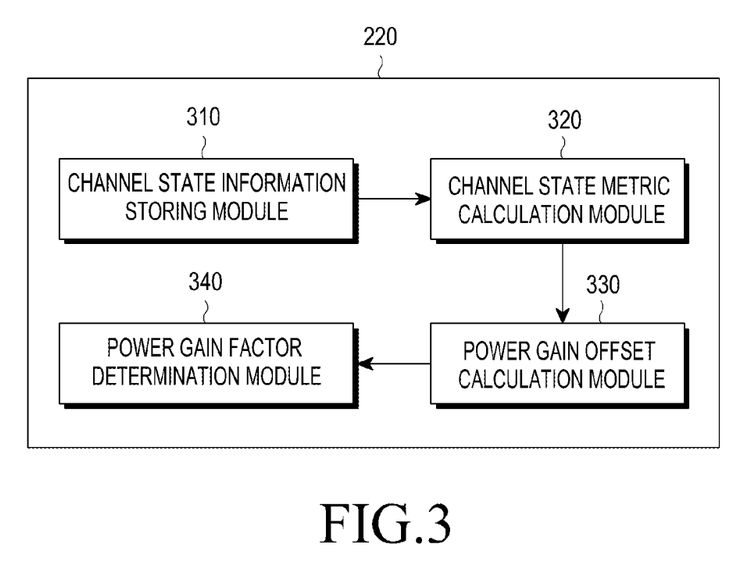
FIG. 3 illustrates an Uplink (UL) power control procedure in a communication system according to an example embodiment of the present disclosure.

FIG. 3 is a block diagram of a controller included in a UE according to an example embodiment of the present disclosure.

Referring to FIG. 3, the controller 220 included in the UE may include a channel state information storing module 310, a channel state metric calculation module 320, a power gain offset calculation module 330, and a power gain factor determination module 340.

Herein, a term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component that performs one or more functions. The "module" may be implemented mechanically or electronically.

For example, the "module" according to some example embodiment of the present disclosure may include at least one of an Application-Specific Integrated Circuit (ASIC) chip, Field-Programmable Gate Arrays (FPGAs), or a programmable-logic device performing certain operations already known or to be developed.

The channel state information storing module 310 may receive, decode, and/or store HS-DSCH DL data or a TPC command of an active set including a serving cell. For example, DL data received through the HS-DSCH for each HARQ process ID may be decoded. If there is an error in a reception result, the NACK may be stored, and if the reception result is normal, the ACK may be stored. The stored ACK or NACK may be fed back later to the BS through the HS-DPCCH. The channel state information storing module 310 may decode the TPC command of the serving cell and store the decoding result in a mobile window buffer, if the combined TPC command requests power decrease. The TPC command refer to a command instructing the UE to increase or decrease or maintain a transmit power of the UL, and may be received through a DL control channel.

The channel state metric calculation module 320 may calculate an HS-DPCCH (e.g., ACK/NACK feedback) transmission error rate based on the decoding result of HS-DSCH DL data stored in the channel state information storing module 310 or calculate a requested rate of power increase of a TPC command of a serving cell in case of power decrease being requested in a combined TPC command based on the combined TPC command and the decoding result of the TPC command of the serving cell, and the UE may recognize a current UL channel state based on the calculated values.

The ACK/NACK feedback transmission error rate may mean a rate of the number of reception failures of the HS-DSCH with respect to the number of ACK/NACK feedback transmissions, and the UE may calculate the ACK/NACK feedback transmission error rate by transmitting the ACK/NACK feedback to the BS in a previous subframe and then making a comparison to determine whether corresponding DL data is correctly transmitted in a next subframe. That is, if the UE transmits the NACK feedback to the BS because an error has occurred in DL data reception in the previous subframe, then the UE may expect reception of retransmitted data for DL data of the previous subframe in the next subframe. Thus, if the retransmitted data for the DL data of the previous subframe is received in the next subframe, the UE determines that an ACK/NACK feedback transmission error does not occur. On the other hand, if new data is received for the DL data of the previous subframe in place of the retransmitted data in the next subframe, then the UE determines that the ACK/NACK feedback transmission error occurs and increases the number of error occurrences. Likewise, if the ACK feedback is transmitted to the BS because no error has occurred in DL data reception in the previous subframe, then the UE may expect reception of new DL data in the next subframe. Thus, if the retransmitted data is received for the DL data of the previous subframe in the next subframe, then the UE may determine that the ACK/NACK feedback transmission error occurs and increase the number of error occurrences. On the other hand, if the new data is received in the next subframe, the UE determines that an ACK/NACK feedback transmission error does not occur.

The requested rate of power increase of the TPC command of the serving cell may be calculated as a rate of the number of power increase requests with respect to the number of TPC command receptions stored in the mobile window buffer. Generally, the UE determines a combined TPC command after receiving TPC commands of active sets, and if one of the active sets transmits a command for decreasing a transmit power, the UE determines the combined TPC command as a transmit power decrease. However, according to the present disclosure, if the combined TPC command requests power decrease, the UE calculates the number of transmit power increase request commands among TPC commands of the serving cell stored in the mobile window buffer, and increases the ACK/NACK feedback transmit power if the number of transmit power increase requests of the TPC command of the serving cell in a desired (or alternatively, threshold or predetermined) window.

If the ACK/NACK feedback transmission error rate increases or a requested rate of power increase of the TPC command of the serving cell increases in case of power decrease being requested in the combined TPC command, the channel state metric calculation module 320 may determine that the UL channel state is deteriorated, determine the ACK/NACK feedback transmit power by adding a power gain offset according to the present disclosure to an index ($\Delta_{ACK}$, $\Delta_{NACK}$) signaled by the BS to the UE, and deliver the calculated ACK/NACK feedback transmission error rate or the calculated power increase request rate of the TPC command of the serving cell to the power gain offset determination module 330.

The power gain offset determination module 330 may determine the power gain offset for ACK/NACK feedback transmission based on the ACK/NACK feedback transmission error rate or the power increase request rate of the TPC command of the serving cell in case of power decrease being requested in the combined TPC command, that are calculated by the channel state metric calculation module 320. The power gain offset may be determined by comparing the ACK/NACK feedback transmission error rate or the requested rate of power increase of the TPC command of the serving cell with at least one desired (or alternatively, predetermined) threshold value. For example, for two threshold values for each of the ACK/NACK feedback transmission error rate, if the ACK/NACK feedback transmission error rate exceeds a first threshold value, the power gain offset may be determined as a first value; and if the ACK/NACK feedback transmission error rate exceeds a second threshold value, which is greater than the first threshold value, the power gain offset may be determined as a second value, which is greater than the first value Likewise, for example, for two threshold values for the requested rate of power increase of the TPC command of the serving cell in case of power decrease being requested in the combined TPC command, if the requested rate of power increase of the TPC command of the serving cell exceeds a third threshold value, the power gain offset may be determined as a third value; and if the ACK/NACK feedback transmission error rate exceeds a fourth threshold value, which is greater than the third threshold value, the power gain offset may be determined as a fourth value, which is greater than the third value. The first and third threshold values may be set to an identical value or different values, and the second and fourth threshold values may be set to an identical value or different values. The first and third values, which indicate power gain offsets, may be set to an identical value or different values, and the second and fourth values, which indicate power gain offsets, may be set to an identical value or different values. The ACK/NACK feedback transmission error rate and the requested rate of power increase of the TPC command of the serving cell may be considered at the same time. In this case, weight values for the ACK/NACK feedback transmission error rate and the requested rate of power increase of the TPC command of the serving cell may be set to an identical value or different values. If the weight values are different, an increase with respect to an initial value of a power gain offset according to one of the two rates (e.g., the ACK/NACK feedback transmission error rate and the requested rate of power increase of the TPC command of the serving cell) that is determined to have a more influence upon HS-DPCCH transmission may be set higher than a power gain offset increase according to the other one of the two rates that has a lower weight value.

In another example embodiment where the two rates (e.g., the ACK/NACK feedback transmission error rate and the requested rate of power increase of the TPC command of the serving cell) are considered at the same time, if the ACK/NACK feedback transmission error rate exceeds a threshold value, the power gain offset may be increased and the power gain offset increase may be adjusted according to the requested rate of power increase of the TPC command of the serving cell. For example, if the ACK/NACK feedback transmission error rate exceeds the first threshold value and the requested rate of power increase of the TPC command of the serving cell is less than the second threshold value, the power gain offset may be increased to, for example, 1 to increase the power gain offset. Then the power gain offset may be increased to, for example, 2 after the requested rate of power increase of the TPC command of the serving cell exceeds the second threshold value. The power gain offset may be increased up to, for example, 2 until the power gain offset reaches a desired (or alternatively, predetermined) reference value, and if the increased power gain offset exceeds the desired (or alternatively, predetermined) reference value, the power gain offset increase may be decreased to, for example, 1.

In another example embodiment where the two rates (e.g., the ACK/NACK feedback transmission error rate and the requested rate of power increase of the TPC command of the serving cell) are considered at the same time, if received signal strengths of neighboring cells are greater than or equal to a threshold value, but a received signal strength of the serving cell is less than the threshold value, the power increase request of the TPC command of the serving cell may be considered primarily to adjust a transmit power and the HARQ error rate may be considered as an additional condition. That is, if the requested rate of power increase of the TPC command of the serving cell exceeds a threshold value, the power gain offset may be increased, and a power gain offset increase may be adjusted according to the ACK/NACK feedback transmission error rate. For example, if the requested rate of power increase of the TPC command of the serving cell exceeds the first threshold value and the ACK/NACK feedback transmission error rate is less than the second threshold value, the power gain offset may be increased to, for example, 1 to increase the power gain offset. Then the power gain offset may be increased to, for example, 2 after the ACK/NACK feedback transmission error rate exceeds the second threshold value. The power gain offset may be increased up to, for example, 2 until the power gain offset reaches a desired (or alternatively, predetermined) reference value, and if the increased power gain offset exceeds the desired (or alternatively, predetermined) reference value, the power gain offset increase may be decreased to, for example, 1.

The method for adjusting a power gain offset according to the present disclosure may be carried out by those of ordinary skill in the art in various manners. For all the foregoing cases, the power gain offset may be set not to exceed a maximum transmit power allowable range scheduled for the UE by the BS. The power gain offset may be calculated in real time or may be previously stored in the form of a lookup table according to a desired (or alternatively, predetermined) rule.

The power gain factor determination module 340 may determine the quantized power gain factor rate $A_{hs}$ in Table 1 based on a final index determined by adding the power gain offset determined by the power gain offset calculation module 330 to the index ($\Delta_{ACK}$, $\Delta_{NACK}$) signaled from the BS to the UE. The power gain factor determination module 340 may determine a power gain factor ($\beta_{hs-ACK}$, $\beta_{hs-NACK}$) based on the determined power gain factor rate $A_{hs}$ and the power gain factor $\beta_c$ of the DPCCH determined by closed-loop power control, determine the ACK/NACK feedback transmit power based on the determined power gain factor ($\beta_{hs-ACK}$, $\beta_{hs-NACK}$), and apply the determined ACK/NACK feedback transmit power.

Figure 4:
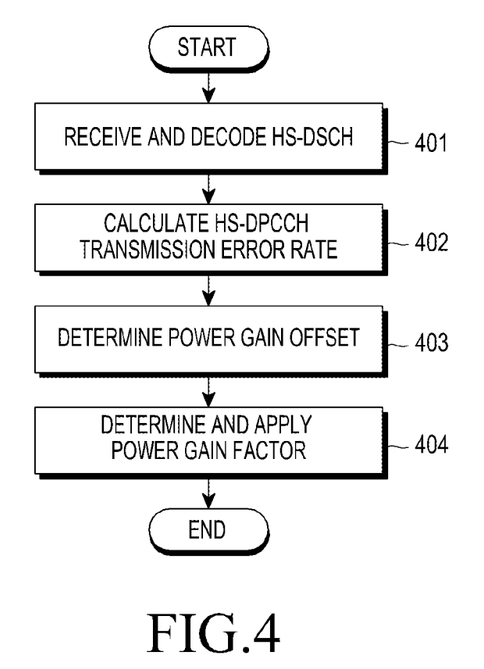
FIG. 4 illustrates a procedure for determining an ACK/NACK feedback transmit power by a UE in a communication system according to a first example embodiment of the present disclosure.

FIG. 4 illustrates a procedure for determining an ACK/NACK feedback transmit power by a UE in a communication system according to a first example embodiment of the present disclosure.

Referring to FIG. 4, the UE receives, decodes, and stores HS-DSCH DL data. That is, in operation 401, DL data received through the HS-DSCH for each HARQ process ID may be decoded. If there is an error in a reception result, the NACK is stored, and if the reception result is normal, the ACK is stored. Next, in operation 402, a HS-DPCCH (ACK/NACK feedback) transmission error rate may be calculated based on a decoding result of the stored HS-DSCH DL data. The ACK/NACK feedback transmission error rate may be calculated by transmitting the ACK/NACK feedback to the BS in a previous subframe and then making a comparison to determine whether corresponding DL data is correctly transmitted in a next subframe. In operation 403, if the ACK/NACK feedback transmission error rate exceeds a desired (or alternatively, predetermined) value, the UE may determine that an UL channel state is deteriorated, determine an ACK/NACK feedback transmit power by adding a power gain offset to an index ($\Delta_{ACK}$, $\Delta_{NACK}$) signaled by the BS to the UE, and determine the power gain offset for ACK/NACK feedback transmission based on the ACK/NACK feedback transmission error rate calculated in operation 402. The power gain offset may be determined by comparing the ACK/NACK feedback transmission error rate with at least one desired (or alternatively, predetermined) threshold value. Next, the UE determines the quantized power gain factor rate $A_{hs}$ in Table 1 based on a final index determined by adding the power gain offset determined in operation 403 to the index ($\Delta_{ACK}$, $\Delta_{NACL}$) signaled from the BS to the UE. In operation 404, the power gain factor determination module 340 may determine a power gain factor ($\beta_{hs-ACK}$, $\beta_{hs-NACK}$) based on the determined power gain factor rate $A_{hs}$ and the power gain factor $\beta_c$ of the DPCCH determined by closed-loop power control, determine the ACK/NACK feedback transmit power based on the determined power gain factor ($\beta_{hs-ACK}$, $\beta_{hs-NACK}$), and apply the determined ACK/NACK feedback transmit power.

Figure 5:
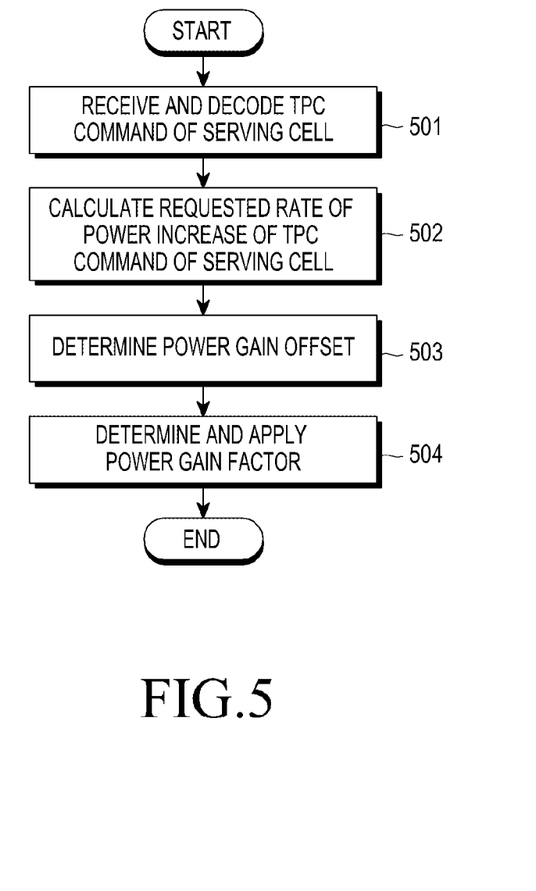
FIG. 5 illustrates a procedure for determining an ACK/NACK feedback transmit power by a UE in a communication system according to a second example embodiment of the present disclosure.

FIG. 5 illustrates a procedure for determining an ACK/NACK feedback transmit power by a UE in a communication system by considering a requested rate of power increase of a TPC command of a serving cell in case of power increase being requested in a combined TPC command by the UE, according to the second example embodiment of the present disclosure.

Referring to FIG. 5, the UE receives, decodes, and stores TPC commands (or alternatively, a combined TPC commands) of active set cells, that includes a TPC command of a serving cell a serving cell in the active set cells, in operation 501. That is, the UE may decode a TPC command received from the serving cell when the combined TPC command requests power decrease, and stores the decoded TPC command in a mobile window buffer. Next, in operation 502, the UE calculates a requested rate of power increase of the TPC command of the serving cell based on the stored decoding result of the TPC command of the serving cell. The requested rate of power increase of the TPC command of the serving cell may be calculated as a rate of the number of power increase requests with respect to the number of TPC command receptions stored in the mobile window buffer. If the requested rate of power increase of the TPC command of the serving cell exceeds a reference value, the UE may determine a power gain offset for ACK/NACK feedback transmission based on the calculated requested rate of power increase of the TPC command of the serving cell in operation 503. The power gain offset may be determined by comparing the requested rate of power increase of the TPC command of the serving cell with at least one desired (or alternatively, predetermined) threshold value. Next, the UE may determine the quantized power gain factor rate $A_{hs}$ in Table 1 based on a final index determined by adding the power gain offset determined in operation 503 to the index ($\Delta_{ACK}$, $\Delta_{NACK}$) signaled from the BS to the UE. In operation 504, the power gain factor determination module 340 may determine a power gain factor ($\beta_{hs-ACK}$, $\beta_{hs-NACK}$) based on the determined power gain factor rate $A_{hs}$ and the power gain factor $\beta_c$ of the DPCCH determined by closed-loop power control, determine the ACK/NACK feedback transmit power based on the determined power gain factor ($\beta_{hs-ACK}$, $\beta_{hs-NACK}$), and apply the determined ACK/NACK feedback transmit power.

Figure 6:
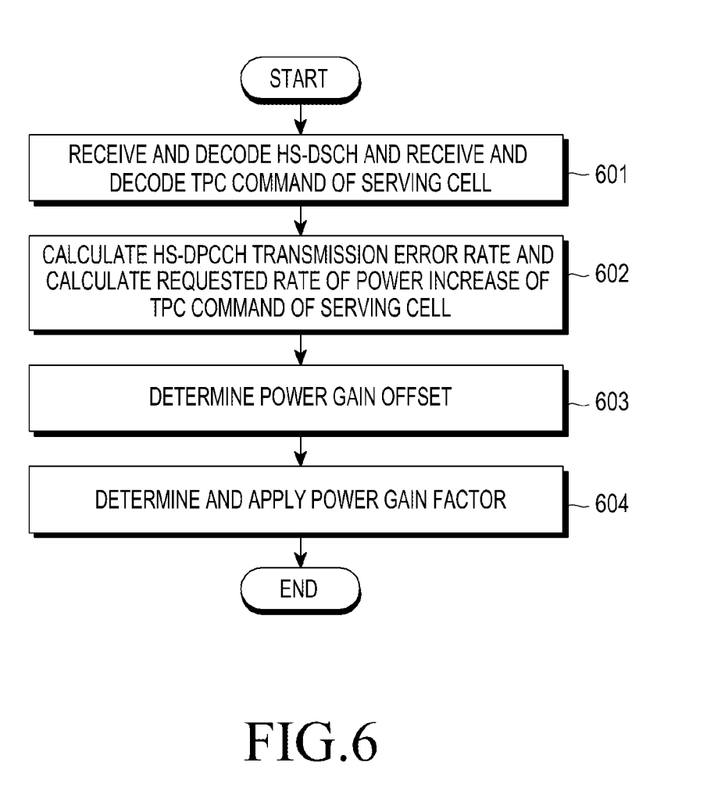
FIG. 6 illustrates a procedure for determining an ACK/NACK feedback transmit power by a UE in a communication system according to a third example embodiment of the present disclosure.

FIG. 6 illustrates a procedure for determining an ACK/NACK feedback transmit power by a UE in a communication system by considering an ACK/NACK feedback transmission error rate and a requested rate of power increase of a TPC command of a serving cell in case of power increase being requested in a combined TPC command by the UE, according to a third example embodiment of the present disclosure.

Referring to FIG. 6, the UE receives, decodes, and stores HS-DSCH DL data, TPC commands (or alternatively, a combined TPC commands) of active set cells, that includes a TPC command of a serving cell in the active set cells, in operation 601. That is, DL data received through the HS-DSCH for each HARQ process ID may be decoded. If there is an error in a reception result, the NACK may be stored, and if the reception result is normal, the ACK may be stored. The UE may decode a TPC command received from the serving cell when the combined TPC command requests power decrease, and store the decoded TPC command in a mobile window buffer. Next, the UE may calculate an HS-DPCCH (ACK/NACK feedback) transmission error rate based on the decoding result of the HS-DSCH DL data stored in operation 601, and calculate a requested rate of power increase of the TPC command of the serving cell based on the decoding result of the TPC command of the serving cell, in operation 602. If one of the calculated ACK/NACK feedback transmission error rate or the calculated requested rate of power increase of the TPC command of the serving cell exceeds a reference value, the UE may determine that the UL channel state is deteriorated, and determine a power gain offset for ACK/NACK feedback transmission based on the other one of the calculated ACK/NACK feedback transmission error rate and the calculated requested rate of power increase of the TPC command of the serving cell, in operation 603. For example, if the ACK/NACK feedback transmission error rate exceeds a threshold value, the power gain offset may be increased and the power gain offset increase may be adjusted according to the requested rate of power increase of the TPC command of the serving cell. If the requested rate of power increase of the TPC command of the serving cell exceeds a threshold value, the power gain offset is increased, and a power gain offset increase may be adjusted according to the ACK/NACK feedback transmission error rate. Next, the UE may determine the quantized power gain factor rate $A_{hs}$ in Table 1 based on a final index determined by adding the power gain offset determined in operation 603 to the index ($\Delta_{ACK}$, $\Delta_{NACK}$) signaled from the BS to the UE. In operation 604, the power gain factor determination module 340 may determine a power gain factor ($\beta_{hs\text{-}ACK}$, $\beta_{hs\text{-}NACK}$) based on the determined power gain factor rate $A_{hs}$ and the power gain factor $\beta_c$ of the DPCCH determined by closed-loop power control, determine the ACK/NACK feedback transmit power based on the determined power gain factor ($\beta_{hs\text{-}ACK}$, $\beta_{hs\text{-}NACK}$), and apply the determined ACK/NACK feedback transmit power.

Figure 7A:
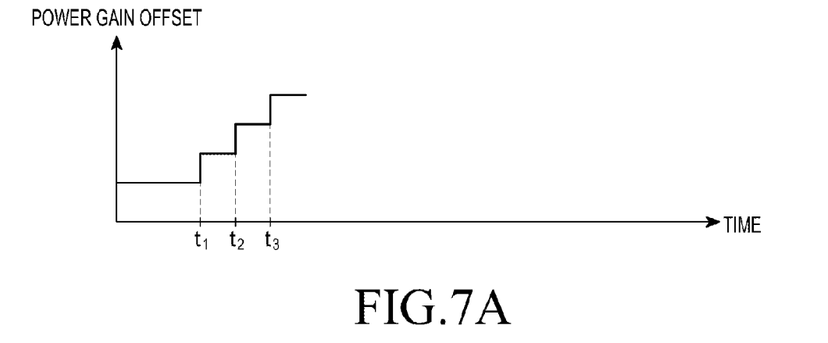
FIGS. 7A, 7B, and 7C illustrate a method of determining a power gain offset according to an example embodiment of the present disclosure.
Figure 7B:
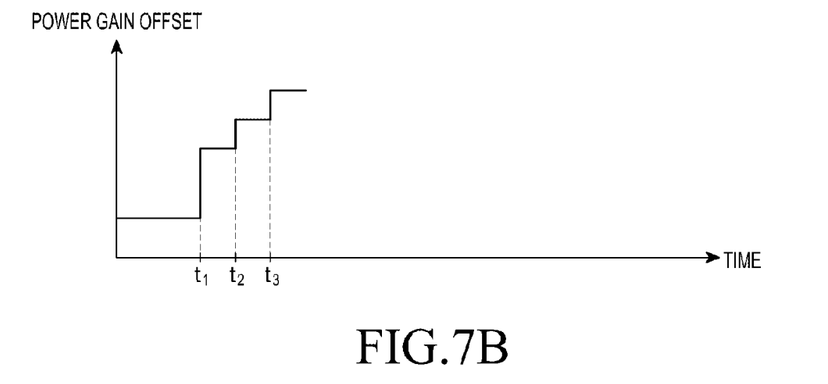
Figure 7C:
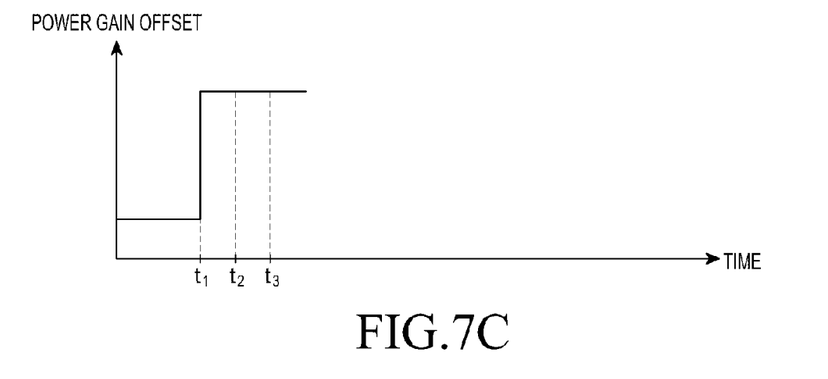

FIGS. 7A, 7B, and 7C illustrate a method of determining a power gain offset according to an example embodiment of the present disclosure.

Referring to FIG. 7A, as described with reference to FIGS. 3 through 6, when a power gain offset is determined by considering at least one of an ACK/NACK feedback transmission error rate and a requested rate of power increase of a TPC command of a serving cell in case of power increase being requested in a combined TPC command, once the UE determines to increase a power gain offset as the ACK/NACK feedback transmission error rate and the requested rate of power increase of the TPC command of the serving cell increase, then the UE may increase the power gain offset at the same rate.

Referring to FIG. 7B, as described with reference to FIGS. 3 through 6, when a power gain offset is determined by considering at least one of an ACK/NACK feedback transmission error rate and a requested rate of power increase of a TPC command of a serving cell in case of power increase being requested in a combined TPC command, once the UE determines to increase a power gain offset as the ACK/NACK feedback transmission error rate and the requested rate of power increase of the TPC command of the serving cell increase, then the UE may set an initial increase rate to be higher than subsequent increase rate(s).

Referring to FIG. 7C, as described with reference to FIGS. 3 through 6, when a power gain offset is determined by considering at least one of an ACK/NACK feedback transmission error rate and a requested rate of power increase of a TPC command of a serving cell in case of power increase being requested in a combined TPC command, once the UE determines to increase a power gain offset as the ACK/NACK feedback transmission error rate and the requested rate of power increase of the TPC command of the serving cell increase, then the UE may set one initial power gain offset to a maximum value and then maintains the increased value until the ACK/NACK transmission ends.

The method for adjusting a power gain offset according to the present disclosure may be carried out by those of ordinary skill in the art variously as well as in a manner illustrated in FIGS. 7A, 7B, and 7C. For all the foregoing cases, the power gain offset determined finally may be set not to exceed a maximum transmit power allowable range scheduled for the UE by the BS. The power gain offset may be calculated in real time or may be previously stored in the form of a lookup table according to a desired (or alternatively, predetermined) rule.

According to the present disclosure, HARQ error recovery ability and/or a data throughput may be improved by improving an ACK/NACK feedback transmission success rate in a distorted wireless channel environment.

It should be noted that FIGS. 1 through 7 are not intended to limit the scope of the present disclosure. A particular operation or element of the method or structure described with reference to FIGS. 1 through 7 should not be interpreted as an essential element for the present disclosure, and it may be variously implemented without departing from the spirit or scope of the inventive concepts described the present disclosure.

The above described operations may be implemented by providing a memory device storing a corresponding program code to an entity of a communication system, a function, or a specific structural element of the UE. That is, the entity, the function, the BS, or the controller of the UE carries out the above described operations by reading and executing the program code stored in the memory device by means of a processor or a Central Processing Unit (CPU). In some example embodiments, the above described operations may be implemented by a memory configured to store computer-readable instructions, and one or more processors configured to execute the computer-readable instructions such that the one or more processors are configured to perform the above described operations.

The entity, the function, the BS, or various structural elements of the UE (for example, a modem chip and/or a RF chip), modules, and the like may be operated by using a hardware circuit (e.g., a complementary metal oxide semiconductor (CMOS)-based logic circuit), firmware, software, and/or a combination of hardware and the firmware and/or software embedded in a machine readable medium. For example, various electric configurations and methods may be carried out by using electric circuits such as transistors, logic gates, and on-demand semiconductors.

For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processor may be a hardware processor such as central processing unit (CPU), a multi-processor, a distributed processing system, an application specific integrated circuit (ASIC), and/or a suitable hardware processing unit. The processing device(s) may run an operating system (OS)

and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While some example embodiments of the present disclosure have been described, various changes may be made without departing the scope of the present disclosure. Therefore, the scope of the present disclosure should be defined by the appended claims and equivalents thereof, rather than by the described example embodiments.

What is claimed is:

1. A method for controlling an uplink (UL) power by a user equipment (UE) in a wireless communication system, the method comprising:
   receiving and decoding downlink (DL) data;
   receiving transmit power control (TPC) commands from active set cells, the active set cells including a serving cell, and decoding the TPC commands to generate a combined TPC command, in which the decoded TPC commands of the active set cells are combined;
   calculating a transmission error rate of a feedback signal with respect to the received DL data based on the decoded DL data;
   calculating a requested rate of transmit power increase of the serving cell when power decrease is requested in the combined TPC command based on the decoded TPC commands;
   determining a transmit power gain offset based on the transmission error rate and the requested rate of transmit power increase of the serving cell;
   determining an UL power for transmitting the feedback signal with respect to the received DL data based on the transmit power gain offset; and
   transmitting the feedback signal based on the UL power.

2. The method of claim 1, further comprising:
   receiving an index signaled by a base station (BS) to the UE; and
   determining the UL power for transmitting the feedback signal from the BS to the UE based on an updated index that is obtained by increasing the index by the transmit power gain offset.

3. The method of claim 1, further comprising:
   storing the decoded TPC command of the serving cell among the decoded TPC commands in a window buffer when the combined TPC command requests power decrease,
   wherein the calculating the requested rate of transmit power increase of the serving cell includes calculating a number of transmit power increase requests of the serving cell with respect to a total number the decoded TPC commands stored in the window buffer.

4. The method of claim 1, wherein the calculating a transmission error rate comprises:
   comparing the feedback signal transmitted in a previous subframe with the DL data received in a current subframe.

5. The method of claim 1, wherein the determining the transmit power gain offset comprises increasing the transmit power gain offset from an initial value when at least one of the transmission error rate or the requested rate of transmit power increase of the serving cell exceeds a threshold value.

6. The method of claim 1, wherein the DL data is received through a high speed-downlink shared channel (HS-DSCH), and the feedback signal is transmitted through a high speed-dedicated physical control channel (HS-DPCCH).

7. An apparatus for controlling an uplink (UL) power in a wireless communication system, the apparatus comprising:
   a transmitter/receiver configured to,
      receive and decode downlink (DL) data,
      transmit a feedback signal with respect to the DL data, and
      receive transmit power control (TPC) commands from active set cells, the active set cells including a serving cell; and
   a controller configured to,
      decode the TPC commands to generate a combined TPC command, in which the decoded TPC commands of the active set cells are combined,
      calculate a transmission error rate of a feedback signal with respect to the received DL data based on the decoded DL data,
      calculate a requested rate of transmit power increase of the serving cell when the combined TPC command requests power decrease based on the decoded TPC commands,
      determine a transmit power gain offset based on the transmission error rate and the requested rate of transmit power increase of the serving cell,
      determine an UL power for transmitting the feedback signal with respect to the received DL data based on the transmit power gain offset, and
      transmit the feedback signal based on the UL power.

8. The apparatus of claim 7, wherein the transmitter/receiver is further configured to receive an index signaled by a base station (BS) to a user equipment (UE), and
   the controller is configured to determine the UL power for transmitting the feedback signal from the BS to the UE based on an index that is obtained by increasing the received index by the transmit power gain offset.

9. The apparatus of claim 7, wherein the controller is further configured to,
   store the decoded TPC command of the serving cell among the decoded TPC commands in a window buffer when the combined TPC command requests power decrease, and calculate a number of transmit power increase requests of the serving cell with respect to a total number of the decoded TPC commands stored in the window buffer.

10. The apparatus of claim 7, wherein the controller is further configured to compare the feedback signal transmitted in a previous subframe with the DL data received in a current subframe.

11. The apparatus of claim 7, wherein the controller is further configured to increase the transmit power gain offset from an initial value when at least one of the transmission error rate or the requested rate of transmit power increase of the serving cell exceeds a threshold value.

12. The apparatus of claim 7, wherein the DL data is received through a high speed-downlink shared channel (HS-DSCH), and the feedback signal is transmitted through a high speed-dedicated physical control channel (HS-DPCCH).

13. A chip for wireless communication, the chip comprising:
  a transmitter/receiver configured to,
    receive downlink (DL) data,
    transmit a feedback signal with respect to the DL data based on an uplink (UL) power, and
    receive transmit power control (TPC) commands from active set cells, the active set cells including a serving cell, the TPC commands being commands instructing a user equipment (UE) to adjust power of an uplink (UL);
  a memory configured to store computer-readable instructions; and
  one or more processors configured to execute the computer-readable instructions such that the one or more processors are configured to,
    decode the TPC commands to generate a combined TPC command in which the decoded TPC commands of the active set cells are combined,
    calculate a requested rate of transmit power increase of the serving cell when the combined TPC command requests power decrease based on the decoded TPC commands,
    determine a transmit power gain offset by comparing the requested rate of transmit power increase of the serving cell with a first threshold value, and
    determine the UL power for transmitting the feedback signal with respect to the DL data based on the transmit power gain offset.

14. The chip of claim 13, wherein the one or more processors is configured to execute the computer-readable instructions such that the one or more processors are configured to,
  decode the DL data,
  calculate a transmission error rate of the feedback signal with respect to the received DL data based on the decoded DL data, and
  determine the transmit power gain offset based on the transmission error rate and further based on the requested rate of transmit power increase of the serving cell when at least one of the transmission error rate or the requested rate of transmit power increase of the serving cell exceeds at least one of the first threshold value associated with the requested rate of transmit power increase of the serving cell or a second threshold value associated with the transmission error rate.

15. The chip of claim 14, wherein the one or more processors is configured to execute the computer-readable instructions such that the one or more processors are configured to increase the transmit power gain offset based on the requested rate of transmit power increase when the transmission error rate exceed the first threshold value.

16. The chip of claim 14, wherein the one or more processors is configured to execute the computer-readable instructions such that the one or more processors are configured to increase the transmit power gain offset based on the transmission error rate when the requested rate of transmit power increase exceed the second threshold value.

17. The chip of claim 13, wherein the one or more processors is configured to execute the computer-readable instructions such that the one or more processors are further configured to,
  receive an index signaled by a base station (BS) to the UE; and
  determine the UL power for transmitting the feedback signal from the BS to the UE based on an updated index that is obtained by increasing the index by a transmit power gain offset.

18. The chip of claim 14, wherein the one or more processors is configured to execute the computer-readable instructions such that the one or more processors are further configured to calculate the transmission error rate by comparing the feedback signal transmitted in a previous subframe with the DL data received in a current subframe.

* * * * *